NORTHRUP, LOOMIS & CLARK.
Thill-Coupling.
No. 37,636. Patented Feb 10, 1863.
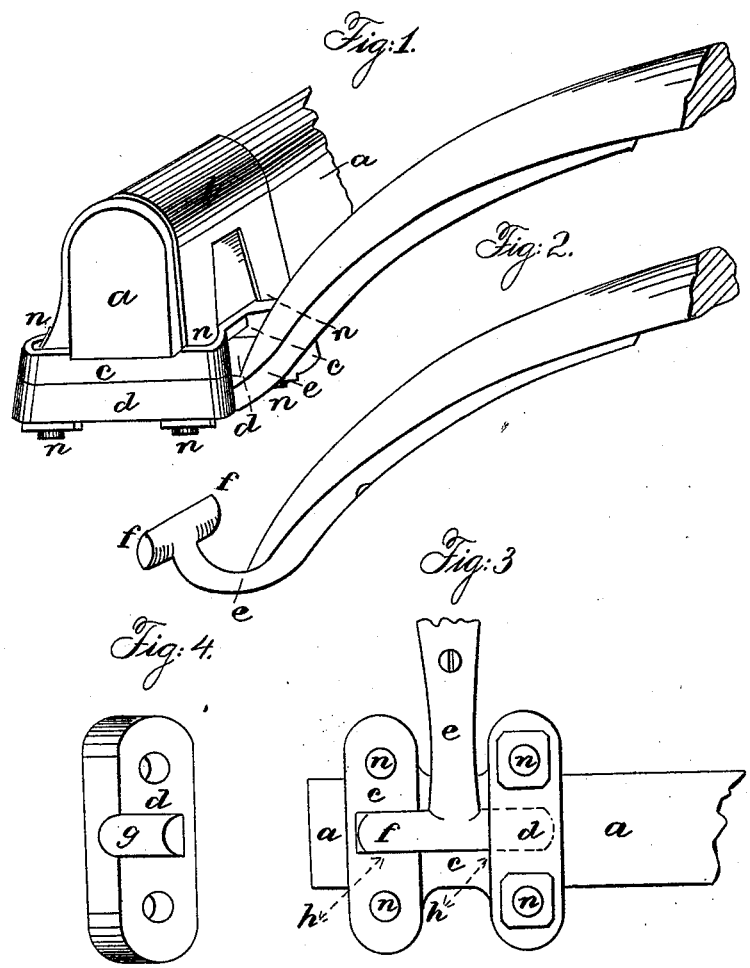

UNITED STATES PATENT OFFICE.

ZECHARIAH LOOMIS, JAMES NORTHRUP, AND GILES W. CLARK, OF HOMER, NEW YORK.

IMPROVEMENT IN ATTACHING SHAFTS OR POLES TO CARRIAGES.

Specification forming part of Letters Patent No. 37,636, dated February 10, 1863.

*To all whom it may concern:*

Be it known that we, ZECHARIAH LOOMIS, JAMES NORTHRUP, and GILES W. CLARK, residents of the town of Homer, in the county of Cortland and State of New York, have invented a new and useful Improvement in Attaching Shafts or Poles to Carriages; and we do hereby declare that the following is a full, clear, and exact description of the construction and operation of the same, reference being had to the annexed drawings, making a part of this specification, in which—

Figure 1 is a perspective view of the improvement attached to the axle. Fig. 2 shows the form and construction of the thill-iron. Fig. 3 shows the under side of the axle and the manner of attaching the thill iron; and Fig. 4, the construction of a single clip-bar, like letters referring to like parts in each.

$a$ is the axle.

$b$ is a double clip passing over the axle.

$c$ is a double clip bar lying flat against the under side of the axle, and through which pass the four screw-shanks of the double clip at $n\ n$. In the under face of this double-clip bar is a longitudinal depression in the shape of a half-cylinder, $h\ h$, to receive the cross-head $f f$ of the thill-iron $e$.

$d\ d$ are single-clip bars running across the axle, with a depression in their upper faces, $g$, corresponding to the depression in the double bar. When put in their places and the nuts are screwed on the shanks of the clip, the cross-head of the thill-iron is securely held in the recess or depression thus formed for it, but free to move, in order that the thill or pole may be raised or lowered, as becomes necessary.

We claim the following advantages from this arrangement of the parts, to wit: First, a carriage is more easily drawn and handled by a horse when the draft is from the center of the axle than when it is from the ears of ordinary clip-bars and devices in front of the axle; second, that the shaft is secured from becoming accidentally detached from the carriage; third, the shafts are easily removed or changed—by removing a single-clip bar upon each side of the carriage the shafts may be sprung in or out; fourth, it is free from rattle and protected from mud and dust.

What we claim, and desire to secure by Letters Patent, is—

The arrangement and combination of the double and single clip bars $c$ and $d\ d$ with the corresponding depressions in each, and when the single bar is made whole and connected with the double clip, and with the T-headed thill or pole iron fitting or working in said depression, as and for the purpose above described.

ZECHARIAH LOOMIS.
JAMES NORTHRUP.
GILES W. CLARK.

Witnesses:
 CHAS. FOSTER,
 WM. S. HUNTER.